United States Patent [19]

Mizokami

[11] 4,432,627
[45] Feb. 21, 1984

[54] APPARATUS FOR COMMUNICATING INFORMATION RELATING TO TAKING LENS

[75] Inventor: Kazunori Mizokami, Hachioji, Japan

[73] Assignee: Olympus Optical Company, Ltd., Japan

[21] Appl. No.: 312,825

[22] Filed: Oct. 19, 1981

[30] Foreign Application Priority Data

Nov. 18, 1980 [JP] Japan ................................. 55-163001

[51] Int. Cl.³ .............................................. G03B 17/00
[52] U.S. Cl. ............................... 354/289.1; 338/32 R; 354/286
[58] Field of Search ............... 354/23 D, 46, 286, 288, 354/289; 338/32 R, 32 H

[56] References Cited

U.S. PATENT DOCUMENTS

| | | | |
|---|---|---|---|
| 3,590,134 | 6/1971 | Ogi | 338/32 R |
| 3,928,858 | 12/1975 | Sakurada et al. | 354/289 |
| 4,104,649 | 8/1978 | Tanaka et al. | 354/286 |
| 4,118,713 | 10/1978 | Murakami et al. | 354/286 |
| 4,196,997 | 4/1980 | Onmori et al. | 354/286 |
| 4,275,953 | 6/1981 | Watanobe et al. | 354/286 |
| 4,360,255 | 11/1982 | Kawasaki | 354/289 |

*Primary Examiner*—Russell E. Adams
*Attorney, Agent, or Firm*—Ostrolenk, Faber, Gerb & Soffen

[57] ABSTRACT

An apparatus for communicating information relating to taking lens comprises a magneto-electric transducer element disposed on a camera body adjacent to a lens mount thereof, and a magnet disposed on the rear end of a lens barrel which receives an interchangeable lens. The magnet produces a magnetic effect upon the transducer element of a magnitude which depends on the value of functional information of each interchangeable lens.

7 Claims, 4 Drawing Figures

APPARATUS FOR COMMUNICATING INFORMATION RELATING TO TAKING LENS

BACKGROUND OF THE INVENTION

The invention relates to an apparatus for communicating information about a taking lens, and more particularly, to such apparatus which communicates functional information about an interchangeable lens barrel which houses the taking lens such as the maximum F-number of the lens, the focal length of the lens or the like to a camera body in a magnetic manner.

In a single lens reflex camera using an interchangeable lens, it is necessary to provide the camera body with functional information about a taking lens mounted on the camera. Such information can include the maximum F-number, minimum diaphragm value, the number of steps of available for the diaphragm values of the lens, the correction of an indication of the opening of the lens or the like. Conventional communication means may comprise a mechanical member such as a diaphragm interlocked member, a member interlocked with the maximum F-number or the like, the displacement of which is utilized to derive functional information. Alternatively, a plurality of electrical contacts may be disposed on the lens and the camera body, respectively, so that information may be communicated therebetween through the conduction or non-conduction between the contacts. However, it will be seen that these techniques represent information communication of so-called contact type wherein an error in the displacement of a mechanical lever may result in the inaccuracy of information or a poor contact between the electrical contacts results in a reduced reliability. In addition, resistors or contacts of a noble metal which provide good conductors must be provided on the part of the camera in order to convert the oncoming signals into electrical signals which are suitable for use in a logic circuit, thus causing the mechanism to be complicated.

Recently, an arrangement for information communication has been proposed wherein an interchangeable lens barrel is provided with PROM (programmable read-only memory) in which information such as the maximum F-number or the like is stored so that the information may be read by an assembly provided on the part of the camera body (see Japanese Laid-Open Patent Application No. 108,628/1979). However, a multiple-pin connector is used to provide a connection between the lens and the camera body, presenting the same difficulty as mentioned above.

SUMMARY OF THE INVENTION

In view of the foregoing, it is an object of the invention to provide an apparatus for communicating information about the taking lens of a camera in which functional information concerning the lens such as the maximum F-number or focal length is communicated to a camera body in a non-contact manner by utilizing magnet and magneto-electric transducer element.

In accordance with the invention, a magneto-electric transducer element is disposed on a camera body adjacent to a lens mount while a magnet is disposed on a lens barrel at a position where it is substantially opposing to the transducer element. The location of the magnet or the field strength thereof is established in accordance with the value of functional information of the lens, thereby allowing a communication of the lens information to the camera body. This achieves a communication of information from the lens barrel to the camera body in a non-contact manner, thus providing a sufficient durability for its use over a prolonged period and a reliable communication of information while eliminating any error in the displacement as may be experienced with mechanical means or any failure resulting from a poor contact as experienced in an electrical connection. In addition, the arrangement of the invention is very simple.

DESCRIPTION OF EMBODIMENT

Figure 1:
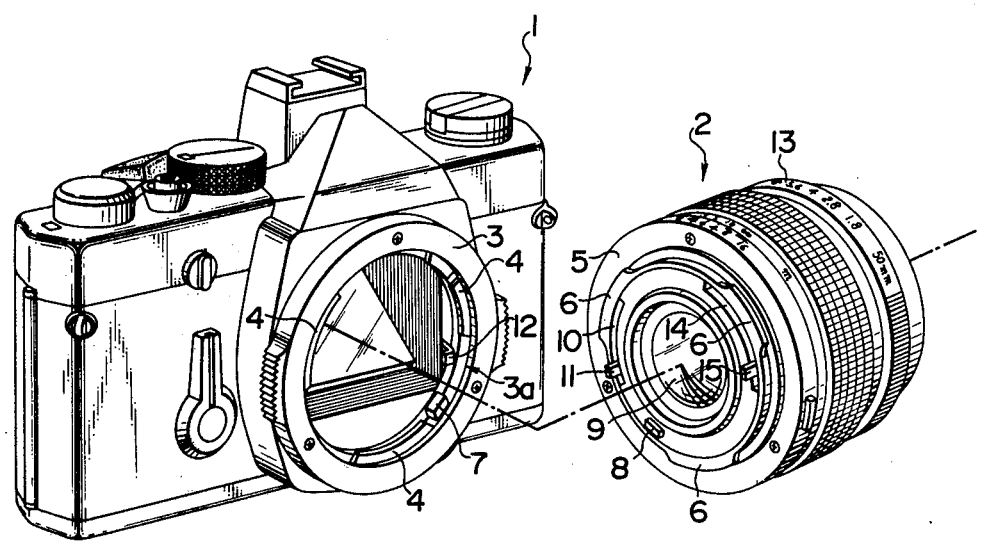
FIG. 1 is a perspective view of an apparatus for communicating information according to one embodiment of the invention.

Referring to FIG. 1, there is shown an apparatus for communicating information according to one embodiment of the invention, in perspective view. In this Figure, a taking lens is shown dismounted from the body of a single lens reflex camera. On its front face, a camera body 1 is centrally formed with a lens mount 3 having claws 4 while a taking lens barrel 2 is provided with claws 6 on its rear end 5 adapted to be located opposite to the lens mount 3, and these claws enable the camera body 1 and barrel 2 to be coupled together in a bayonet fashion. A magneto-electric transducer element 7 such as a Hall element is disposed on the camera body 1 adjacent to one of the claws 4 on the lens mount 3 so as to be slightly retracted from the opening 3a of the mount 3. The transducer element 7 includes lead wires (not shown) which are connected to an electrical circuit contained within the camera body 1. A permanent magnet 8 which is magnetized to a given value is disposed on the rear end 5 of the lens barrel 2 in substantially alignment with the transducer element 7. Preferably, a rare earth magnet which maintains a constant, increased coercive force semi-permanently with a reduced volume is used for the permanent magnet 8. The permanent magnet 8 is located on the rear end 5 of the lens barrel 2 so as to avoid interference with a taking lens 9, and such location varies with the value about functional information of the taking lens 9, for example, the maximum F-number thereof, as will be further described later. Hence, when the claws 6 and 4 are engaged with each other to mount the lens barrel 2 on the camera body 1, the permanent magnet 8 is located substantially opposite to the transducer element 7. However, while the transducer element 7 always assumes a given stationary position, the location of the permanent magnet 8 varies with the value of the maximum F-number of each individual taking lens as mentioned above, thus resulting in a varying relative position therebetween in accordance with the value of the maximum F-number of each taking lens. The rear end of the lens barrel 2 is formed with an arcuate slot 10, through which projects a diaphragm interlocked member 11 which is adapted to engage a diaphragm control member 12 provided on the part of the camera body 1. A diaphragm step number member 15 projects through an arcuate slot 14 and is interlocked with a diaphragm ring 13 of the lens barrel 2 for engagement with a diaphragm step number changing member (not shown) which is provided on the part of the camera body 1.

Figure 2:
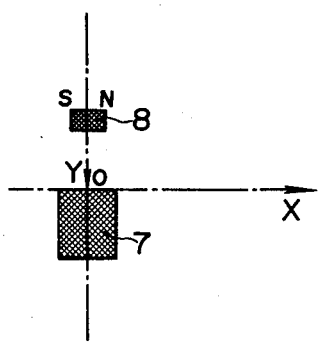
FIG. 2 is a diagrammatic view illustrating the relative position of the magneto-electric transducer element and the permanent magnet used in the apparatus of FIG. 1.
Figure 3:
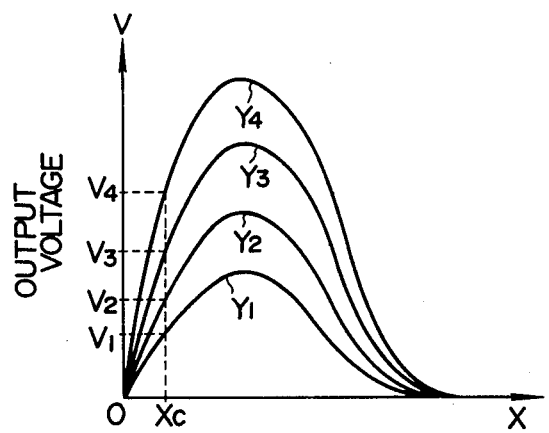
FIG. 3 graphically shows the output voltage from the magneto-electric transducer element as plotted against the relative position between the magnet and the transducer element.

The transducer element 7 may comprise a well known Hall element which develops an electromotive force in a direction perpendicular to the direction of a current flow therethrough and a magnetic field applied to the element in a direction perpendicular to the current flow, or a magnetic resistance element which exhibits an electrical resistance which depends on the field strength. Therefore, it will be seen that when the magnetic field from the permanent magnet 8 is applied to the transducer element 7, a change in the relative position therebetween causes the electromotive force or the output voltage from the transducer element 7 to vary. Assuming that the permanent magnet 8 has its N and S poles disposed to be parallel to the X-axis and the magnetic field is applied to the transducer element 7 in a direction parallel to the X-axis, a change in the relative position between the transducer element 7 and the permanent magnet 8 results in a variation in the output voltage V from the transducer element 7 as shown in FIG. 3. As will be noted from FIGS. 2 and 3, when the permanent magnet 8 is moved in the X- and Y-axis direction, the output voltage V varies. Specifically, when the permanent magnet is moved in the direction of the Y-axis, the output voltage V from the transducer element 7 gradually increases in the manner of curves $Y_1$, $Y_2$, $Y_3$ and $Y_4$ as the permanent magnet 8 is moved closer to the transducer element 7. When the permanent magnet 8 is moved in the direction of the X-axis, the output voltage V reaches its maximum when the central axes of the transducer element 7 and the permanent magnet 8 are slightly misaligned. For example, referring to FIG. 3, when the permanent magnet 8 is located at point Xc on the X-axis and is moved along the Y-axis, the output voltage V from the transducer element 7 gradually increases in the manner of $V_1$, $V_2$, $V_3$ and $V_4$ as the magnet is moved closer to the transducer element 7 as indicated by the curves $Y_1$, $Y_2$, $Y_3$ and $Y_4$.

In this manner, as the relative position between the permanent magnet 8 which is mounted on the rear end 5 of the lens barrel 2 and the magnet electric transducer element 7 on the lens mount 3 of the camera body 1 changes, the output voltage from the transducer element 7 varies, so that the permanent magnet 8 may be located to assume different positions, for example, spaced apart by small increments along the optical axis of the lens 9, in accordance with the value of the maximum F-number of each individual taking lens. In this manner, the output voltage produced by transducer element 7 will vary as different lens barrels carrying taking lenses having different maximum F-numbers are mounted on the camera body 1.

Figure 4:
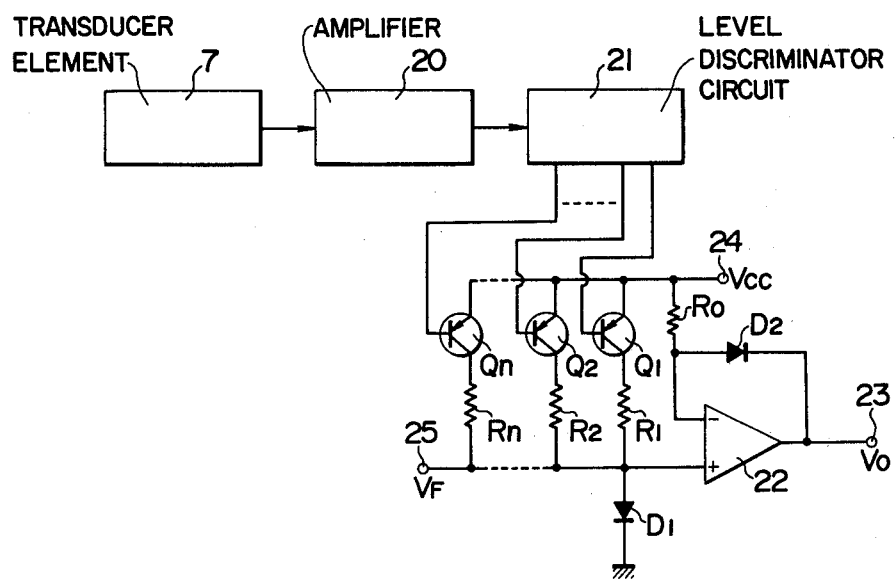
FIG. 4 is a circuit diagram of an electrical circuit which may be utilized to process electrically an output voltage from the magneto-electric transducer element of the apparatus shown in FIG. 1.

The output voltage from the transducer element 7 is applied to an amplifier 20 where it is amplified and then fed to a level discrimination circuit 21, as shown in FIG. 4. The level discrimination circuit 21 includes a plurality of output terminals, and produces a signal at a selected one of these output terminals in accordance with the level of the output voltage from the transducer element 7. This signal is adapted to render one of a plurality of PNP transistors $Q_1$, $Q_2$ ... $Q_n$ conductive, which are connected to an input of an operational amplifier 22. The strength of the magnetic field which is applied to the transducer element 7 from the permanent magnet 8 is inversely proportional to the square of the distance therebetween. Accordingly, the output voltage developed by the transducer element 7 also varies in inversely proportional to the square of the distance. For this reason, an output signal from the level discrimination circuit 21 is subject to a logarithmic compression to provide output information representing the maximum F-number. Each of the transistors $Q_1$ to $Q_n$ is connected in series with a resistor $R_1$ to $R_n$, respectively, the remote end of which is connected in common to the non-inverting input of the operational amplifier 22 which forms part of the logarithmic compression circuit while the respective emitter of these transistors is connected through a common resistor $R_0$ to the inverting input of the operational amplifier 22. A diode $D_1$ has its anode connected to the non-inverting input of the operational amplifier 22 and its cathode connected to the ground while a diode $D_2$ has its anode connected to the inverting input and its cathode connected to an output terminal 23 of the operational amplifier 22. The junction between the resistor $R_0$ and the emitters of the transistors is connected to a terminal 24, to which a supply voltage Vcc is applied while the non-inverting input is connected to a terminal 25, to which a reference voltage VF is applied.

Assuming that a signal from the level discrimination circuit 21 renders the transistor $Q_1$ conductive, then, when the saturating voltage across the collector and emitter of the transistor $Q_1$ is neglected, the output voltage $V_0$ from the output terminal 23 is defined as follows:

$$V_O = \frac{kT}{q}\left(\ln\frac{Vcc - VF}{R_1} - \ln\frac{Vcc - VF}{R_0}\right) \quad (1)$$

$$= \frac{kT}{q}(\ln R_0 - \ln R_1)$$

$$= \frac{kT}{q}\ln\frac{R_0}{R_1}$$

where k represents the Boltzmann constant, T represents the absolute temperature and q represents the charge of an electron.

By choosing the resistance of the resistors $R_1$ to $R_n$ in a manner such that $R_1=R_0$, $R_2=R_0/2$, $R_3=R_0/4$ ... $R_4=R_0/2n-1$ to establish an operating point for the transistors $Q_1$ to $Q_n$, it will be seen that there can be obtained at the output terminal 23 of the operational amplifier 22 an output which changes in steps of $\Delta V_0=(kT/q)n\ 2(V/STEP)$ as a function of the maximum F-number of the taking lens 9. By way of example, if the level discrimination circuit 21 is arranged to render the transistor $Q_2$ conductive when an F1.4 lens is mounted on the lens mount 3, it will render transistor $Q_3$ (not shown) conductive when an F4 lens is mounted on lens mount 3.

In the described arrangement, the permanent magnet 8 which is magnetized to a given value is located at a position which depends on functional information regarding the lens used in order to produce a change in the output voltage from the transducer element 7. However, alternatively, the permanent magnet may be disposed at a given location on the lens barrel 2 so as to maintain a constant spacing from the transducer element 7, with the field strength of the permanent magnet being changed in accordance with the magnitude of functional information regarding the lens.

Instead of the maximum F-number, the focal length of a lens may be transmitted as functional information from the lens barrel 2 to the camera body 1.

In the apparatus of the embodiment described above, the diaphragm step number member 15 mounted on the lens barrel 2 is utilized to communicate the number of diaphragm steps to the camera body 1, but it is also possible to communicate the number of diaphragm steps to the camera body 1 by utilizing a magnet, the location of which is changed in accordance with the number of diaphragm steps in interlocked relationship with the diaphragm ring 13.

What is claimed is:

1. Apparatus for determining at least one characteristic of a taking lens which forms part of a lens barrel which is removably mounted on a camera body, said apparatus comprising:
   a magnetic element stationarily mounted on said lens barrel, at least one of the position of said magnetic element with respect to said lens barrel or the strength of said magnetic element being indicative of said at least one characteristic of said taking lens;
   a magneto-electric transducer element stationarily mounted on said camera body for generating an electric signal whose magnitude varies as a function of the magnetic force applied thereto; and
   means for positioning said lens barrel at a predetermined location with respect to said camera body when said lens barrel is mounted on said camera body such that the magnitude of said electric signal is indicative of said at least one characteristic of said taking lens.

2. An apparatus according to claim 1, wherein said magneto-electric transducer element comprises a Hall element.

3. An apparatus according to claim 1, wherein said magneto-electric transducer element comprises a magnetic resistance element.

4. An apparatus according to claim 1, further comprising an amplifier for amplifying said electric signal and a level discrimination circuit which discriminates between different levels of said signal to determine said at least one characteristic of said taking lens.

5. An apparatus according to claim 1, wherein said magnetic element comprises a rare earth permanent magnet.

6. An apparatus according to claim 1, in which the location of said magnetic element with respect to said magneto-electric transducer element is determined by the value of said at least one characteristic of said taking lens.

7. An apparatus according to claim 1, in which the field strength of said magnet is determined by the value of said at least one characteristic of said taking lens.

* * * * *